United States Patent
Girin et al.

(10) Patent No.: US 11,187,251 B2
(45) Date of Patent: Nov. 30, 2021

(54) DEVICE AND METHOD FOR RING GATE CLOSING OPTIMIZATION

(71) Applicant: GE Renewable Technologies, Grenoble (FR)

(72) Inventors: Philippe Girin, Grenoble (FR); Armin Steinhilber, Grenoble (FR)

(*) Notice: Subject to any disclaimer, the term of this patent is extended or adjusted under 35 U.S.C. 154(b) by 0 days.

(21) Appl. No.: 17/000,752

(22) Filed: Aug. 24, 2020

(65) Prior Publication Data
US 2020/0386247 A1    Dec. 10, 2020

Related U.S. Application Data

(62) Division of application No. 16/586,994, filed on Sep. 29, 2019, now abandoned.

(30) Foreign Application Priority Data

Oct. 2, 2018  (EP) .................................... 18306302

(51) Int. Cl.
*F15B 11/22*     (2006.01)
*F15B 15/14*     (2006.01)
(Continued)

(52) U.S. Cl.
CPC .............. *F15B 11/22* (2013.01); *F15B 15/14* (2013.01); *F15B 15/17* (2013.01);
(Continued)

(58) Field of Classification Search
CPC .................................. F15B 11/22; F15B 15/17
See application file for complete search history.

(56) References Cited

U.S. PATENT DOCUMENTS 3,465,648 A    9/1969    Conklin, Jr. et al.
3,757,640 A    9/1973    Karol
(Continued)

FOREIGN PATENT DOCUMENTS

DE    112012007092 T5    7/2015
FR    2955369 A1         7/2011
JP    2011/0122469 A     6/2011

OTHER PUBLICATIONS

European Search Report Corresponding to EP18306302 dated Jan. 23, 2019.

*Primary Examiner* — Michael Leslie
(74) *Attorney, Agent, or Firm* — Dority & Manning. P.A.

(57) ABSTRACT

This invention discloses in particular an actuation cylinder (10) for controlling the movement of a ring-gate (40) of a hydraulic machine, said actuation cylinder (10) comprising a body (18) forming a first chamber (22) provided with a first duct (26) and a second chamber (24) provided with a second duct (28) which are designed to receive an actuating fluid through said first duct (26) and said second duct (28), said chambers being separated from one another by a piston (20) connected to an actuating rod (14) and able to move in said body in a first direction in which the volume of the second chamber increases while the volume of the first chamber decreases, and in a second direction in which the volume of the second chamber decreases while the volume of the first chamber increases, said piston being provided with a rod (30) connected in said second chamber to an area (20b) of the piston turned toward said second chamber, said area (20b) having a surface less than an area (20a) of the piston turned toward the first chamber.

7 Claims, 3 Drawing Sheets

(51) Int. Cl.
  *F15B 15/17*     (2006.01)
  *F16K 3/08*      (2006.01)
  *F16K 31/122*    (2006.01)

(52) U.S. Cl.
  CPC ... *F15B 2211/60* (2013.01); *F15B 2211/7121* (2013.01); *F15B 2211/782* (2013.01); *F16K 3/08* (2013.01); *F16K 31/1225* (2013.01)

(56) References Cited

U.S. PATENT DOCUMENTS

| | | | | |
|---|---|---|---|---|
| 4,409,884 | A * | 10/1983 | Boehringer | F15B 11/22 91/171 |
| 4,434,964 | A * | 3/1984 | Hudon | F16K 3/0254 251/62 |
| 4,448,389 | A * | 5/1984 | Hudon | F03B 11/004 251/62 |
| 4,531,451 | A * | 7/1985 | Mouton | F15B 11/036 91/519 |
| 6,029,450 | A * | 2/2000 | Wittich | F15B 7/005 60/571 |
| 7,269,949 | B1 * | 9/2007 | Petricio Yaksic | F15B 11/22 100/258 R |
| 7,370,569 | B2 | 5/2008 | Schmidt et al. | |
| 9,494,173 | B2 * | 11/2016 | Pavillet | F15B 15/20 |
| 10,041,514 | B2 | 8/2018 | Takakuwa | |
| 2013/0098237 | A1 | 4/2013 | Pavillet et al. | |
| 2015/0285277 | A1 | 10/2015 | Takakuwa | |
| 2020/0102974 | A1 * | 4/2020 | Girin | F03B 3/00 |

\* cited by examiner

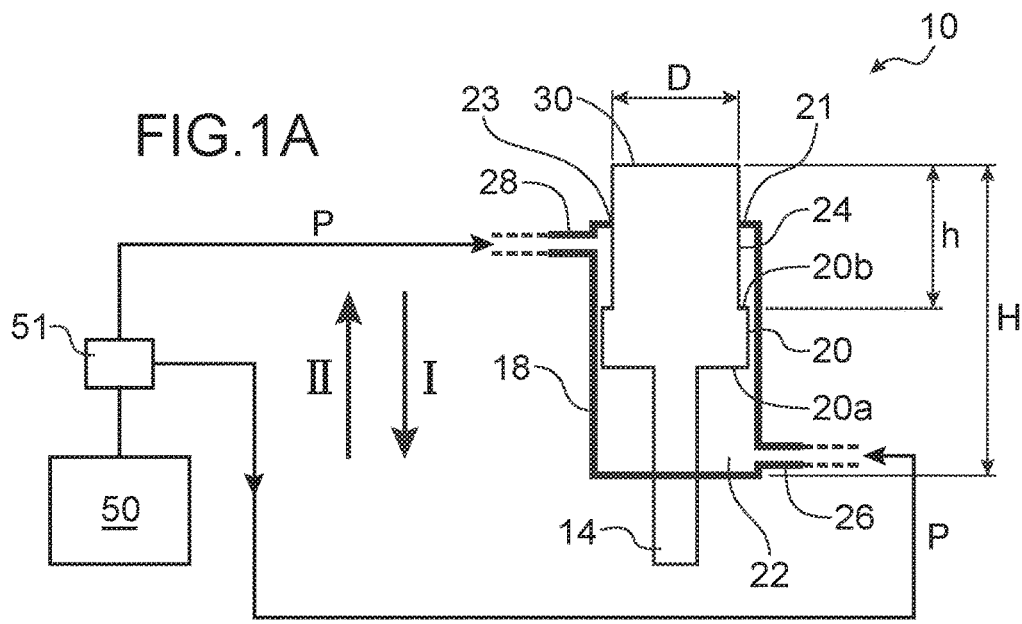
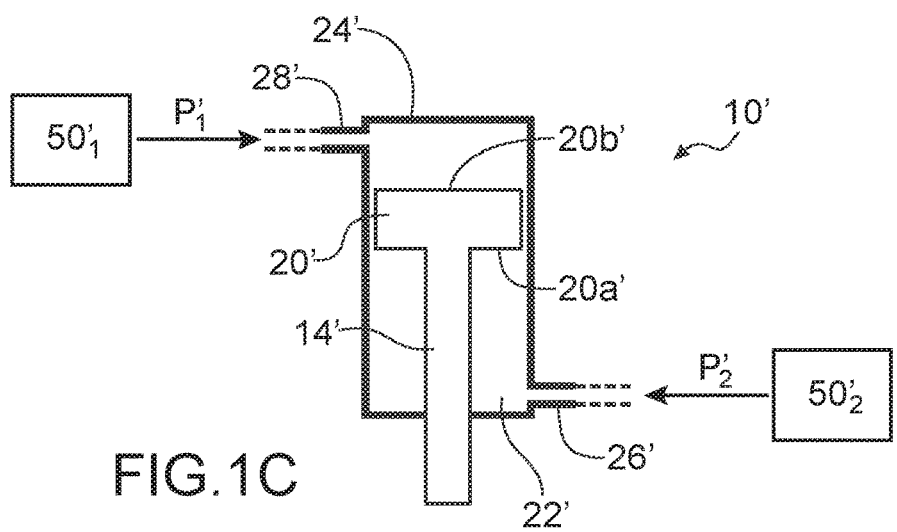
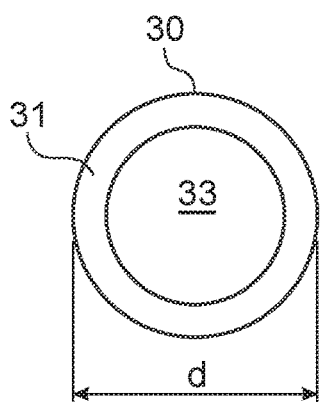

DEVICE AND METHOD FOR RING GATE CLOSING OPTIMIZATION

RELATED APPLICATIONS

The present application is a Divisional Application of U.S. application Ser. No. 16/586,994, filed Sep. 29, 2019, which claims priority to EP 18306302.3, filed Oct. 2, 2018.

TECHNICAL FIELD AND PRIOR ART

The invention relates to the field of hydropower industry.

A ring gate is an optional mechanical component of a turbine, pump or pump-turbine, used to isolate the machine from the upstream water conduct in stopped conditions, in maintenance and in case of default of wicket gate closure or main mechanical failure and able to cut off the passing flow.

A ring gate is mainly a cylindrical shell which moves along its longitudinal axis with a fixed stroke from an open to a closed position and conversely.

The linear stroke of the cylindrical shell is appropriate to the turbine, pump or pump-turbine in which the ring gate is fitted.

A well-known solution to operate a ring gate is to use several hydraulic cylinders distributed around the circumference of one end of the ring gate, the axis of the hydraulic cylinders being parallel to the longitudinal axis of the cylindrical shell.

The bodies of the hydraulic cylinders are supported by a stationary part of the turbine, pump or pump-turbine and the ends of the operating rods of the hydraulic cylinders are attached to the circular edge of the cylindrical shell.

A digital and/or hydraulic system controls the simultaneous linear movement of the operating rods of the hydraulic cylinders to move the cylindrical shell, without excessive swing and distortion in order to avoid jamming of the cylindrical shell in the stationary surrounding parts and damaging of the hydraulic cylinders, cylindrical shell and stationary parts.

Generally, the ring gate is "autoclave" or self-sealing and two different pressure levels are used to operate cylinders.
  a high-pressure level to open ring gate, because cylinders must operate against the weight of ring gate and the differential pressure between upstream and downstream pressure of the ring gate when it is closed;
  a low-pressure level to avoid risks of damaging parts in downwards movement when the ring gate is closing, because the ring gate closes naturally by its own weight and the low pressure will help the closure in case of friction point and will avoid mechanical damage by reducing the effort in case of blocking by external element stuck up in the ring gate.

There is a need to reduce the forces or the efforts applied to the cylinders controlling the ring gate.

Prior art systems build two pressure levels from the hydraulic system. Different solutions are possible and request many components to build the two pressure levels, essentially by using two pressure tanks (one per pressure level).

Those solutions are complicated, costly and requesting high level of maintenance.

SUMMARY OF THE INVENTION

The invention first concerns a cylinder comprising a body forming a first chamber provided with a first duct and a second chamber provided with a second duct which are designed to receive an actuating fluid through said first duct and said second duct, said chambers being separated from one another by a piston connected to an actuating rod and able to move in said body in a first direction in which the volume of the second chamber increases while the volume of the first chamber decreases, and in a second direction in which the volume of the second chamber decreases while the volume of the first chamber increases, said piston being provided with an additional element, for example a rod or a cylinder, in said second chamber.

Said additional element is connected in said second chamber to an area of the piston turned toward said second chamber, said area having a surface less than an area of the piston turned toward the first chamber.

Said additional member can be hollow, being just delimited by a wall.

In an actuation cylinder according to the invention, said additional element, for example said rod, extends above a top of said body through a watertight opening.

The invention also concerns a hydraulic system, which can be implemented in the control of the movement of a ring-gate of a hydraulic machine, said hydraulic system comprising at least one actuation cylinder according to the invention, and a same hydraulic circuit for feeding said first chamber through said first duct and said second chamber through said second duct with a fluid at a same pressure.

A cylinder according to the invention thus allows the use of one high-pressure level only for opening and closing, which decreases the hydraulic components number, increasing robustness and decreasing the cost of the whole system.

The invention also concerns a system for controlling the movement of a ring gate, comprising a plurality of actuation cylinders, each according to the invention.

The invention also concerns a system for controlling the movement of a ring gate, comprising a plurality of groups actuation cylinders, each group comprising at least:
  a first actuation cylinder according to the invention;
  a second actuation cylinder comprising a body forming a first chamber and a second chamber which are designed to receive an actuating fluid, said chambers being separated from one another by a piston connected to an actuating rod and able to move said body in a first direction in which the volume of the second chamber increases while the volume of the first chamber decreases, and in a second direction in which the volume of the second chamber decreases while the volume of the first chamber increases;
  a hydraulic synchronization member connecting said first chamber of said first actuation cylinder and said second chamber said second actuation cylinder.

The invention also concerns a hydraulic machine of the turbine, pump or pump-turbine type, comprising a runner and a ring gate able to move between a position of opening and a position of closing at least one channel supplying said runner with water, and:
  a plurality of actuation cylinders according to the invention, each actuating rod being linked with said ring gate to move it between said position of opening and said position of closing;
  or a system according to the invention for controlling the movement of said ring gate.

The invention also concerns a method of operating an actuation cylinder according to the invention, wherein a fluid with a predetermined pressure (P) is fed to said first chamber through said first duct to move said piston in said second direction and the same fluid with said same predetermined pressure (P) is fed to said second chamber through said second duct to move said piston in said first direction.

BRIEF DESCRIPTION OF THE DRAWINGS

FIG. 1A shows a cylinder according to the invention;

FIG. 1B is a cross section of an additional element implemented in a cylinder according to the invention;

FIG. 1C shows a cylinder according to the prior art;

DETAILED DESCRIPTION OF SPECIFIC EMBODIMENTS

Figure 2:
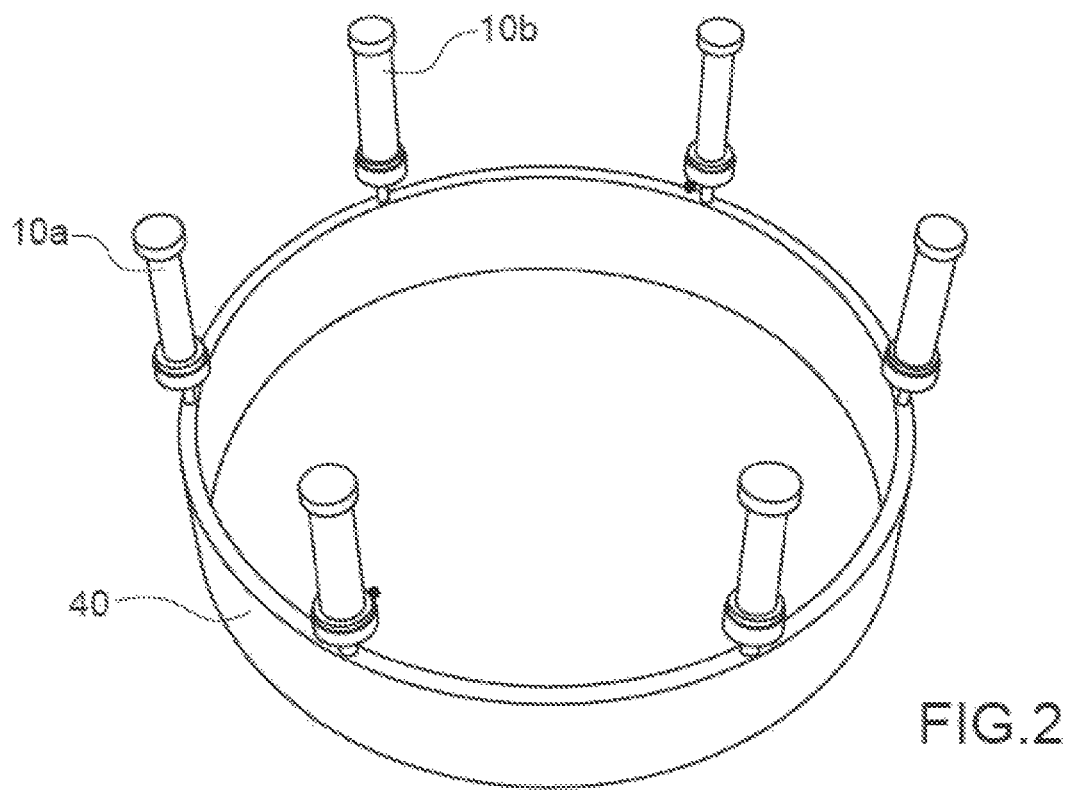
FIG. 2 shows a view of ring gate and of its cylinders.

A cylinder 10 according to the invention is illustrated on FIG. 1A.

It comprises a body 18 forming a first chamber 22 and a second chamber 24 which are each designed to receive and to evacuate an actuating fluid, such as oil, through a duct 26, 28. Said chambers are separated from one another by a piston 20. The piston is connected to an actuating rod 14, which itself is to be connected to a ring gate for actuating it between its open and its closed position. First chamber 22 is situated on the side of the rod relative to piston 20, second chamber 24 being situated on the side opposite the rod relative to piston 20.

Ducts 26, 28 are for connecting each chamber to a hydraulic circuit comprising fluid pressurizing means, for example at least one pump, and to a source of actuating fluid. A control unit controls the actuation of the hydraulic circuit including the fluid pressurizing means. Said control unit can for example comprise a processor or a microprocessor, or an electric or electronic circuit capable of implementing or being programmed to actuate the hydraulic circuit.

Said piston 20 is able to move in the body in a first direction I in which the volume of the second chamber 24 increases while the volume of the first chamber 22 decreases, and then in a second direction II in which the volume of the first chamber 22 increases while the volume of the second chamber 24 decreases.

Piston 20 has two areas 20a and 20b, each perpendicular to directions I and II which are designated "lower piston area" and "upper piston area" and respectively situated on the side of the actuating rod 14 and on the opposite side. A cylinder 10 can be used in any position and the "lower" and "upper" designations should not be interpreted as limiting features of the invention.

Upper piston area 20b is exposed to pressure P to move the piston 20 in said first direction I (when connected to a ring gate, said movement in said first direction I is for closing the ring gate).

Lower piston area 20a is exposed to pressure to move the piston 20 in said second direction II (when connected to a ring gate, said movement in said second direction II is for opening the ring gate).

The second chamber 24 comprises an additional element 30, for example a rod, connected to said upper area 20b. Said additional element 30 is not mechanically connected to any actuating mechanism. It moves together with piston 20.

This additional element 30 reduces the surface S of piston area 20b exposed to pressure P: in particular, the upper piston area 20b has a surface less than the surface of the lower piston area 20a; the corresponding force F applied to said upper piston area 20b in direction I is also reduced (due to the relation P=F/S) in comparison to a cylinder—like on FIG. 1B—in which no additional element 30 is implemented. For example, if said element 30 is a rod, the value of the effort is adjusted by the diameter of said rod.

As a result a same pressure P can be applied to the upper chamber 24 when piston 20 is moved in the body in first direction I and to the lower chamber 22 when piston 20 is moved in the body in second direction II: said same pressure will result in different forces or efforts applied to the upper piston area 20b and to the lower piston area 20a.

A same hydraulic circuit 50 (FIG. 1A) can therefore be implemented to feed both chambers with a same fluid at the same pressure P, this achieving considerable savings in pumps, tanks, valves . . . etc. Through a valve 51, the same hydraulic circuit 50 is connected either to duct 28 (thus feeding upper chamber 24 with a fluid at pressure P) or to duct 26 (thus feeding lower chamber 22 with said same fluid at the same pressure P).

This also reduces the amount of actuating fluid used to control a movement of the piston 20 which means that the hydraulic circuit connected to duct 28 is simplified.

The height h of the additional element 30 is slightly higher than the height of the ring gate or the stroke of the rod.

Element 30 extends beyond the top portion 21 of body 18; when it is in its lowest position in the cylinder it can also extend beyond the top 21 or be flush with it. An opening in said top portion is made so that element 30 can move upwards and downwards together with piston 20. Said opening is watertight (for example with a joint 23) so that element 30 can move upwards and downwards without any loss of fluid.

Preferably, the additional element 30 has a circular cross section in a plane perpendicular to any of directions I or II. But other shapes of said cross section can also be implemented. It is for example a cylindrical rod, preferably hollow, which results in less weight. FIG. 1B shows a cross section, in a plane perpendicular to any of directions I or II, of such an empty rod, reference 31 designating its wall which delimits a hollow internal space 33.

The width d of said cross section (which is a diameter in case of a circular cross section) is calculated depending on the force F which must be applied when actuating piston 20 in direction I.

Closing a ring gate connected to actuating rod 14 is facilitated by the weight of the ring itself but a force must be applied to area 20b in order to control the movement of the rod 14, in particular so that is does not buckle. As explained above, using a cylinder 10 according to the invention, this can be achieved with a same pressure as upon opening the ring gate.

A cylinder 10' according to the prior art is illustrated on FIG. 1C. It bears the same reference numbers as FIG. 1A provided with a "'". The area 20b' bears no additional element 30 in the second chamber 24' and the surface of area 20b' is larger than surface of area 20a'. Thus, for a same pressure P applied to area 20b' and to area 20b (FIG. 1A), the force which must be applied when moving piston 20' in the first direction I is more important than the force applied to piston 20 of FIG. 1A when it is moving in the same first direction. This shows that different pressures $P'_1$, $P'_2$, requiring different hydraulic systems $50'_1$, $50'_2$ (see FIG. 1C) must be used in both directions when implementing a cylinder according to the prior art.

Figure 5:
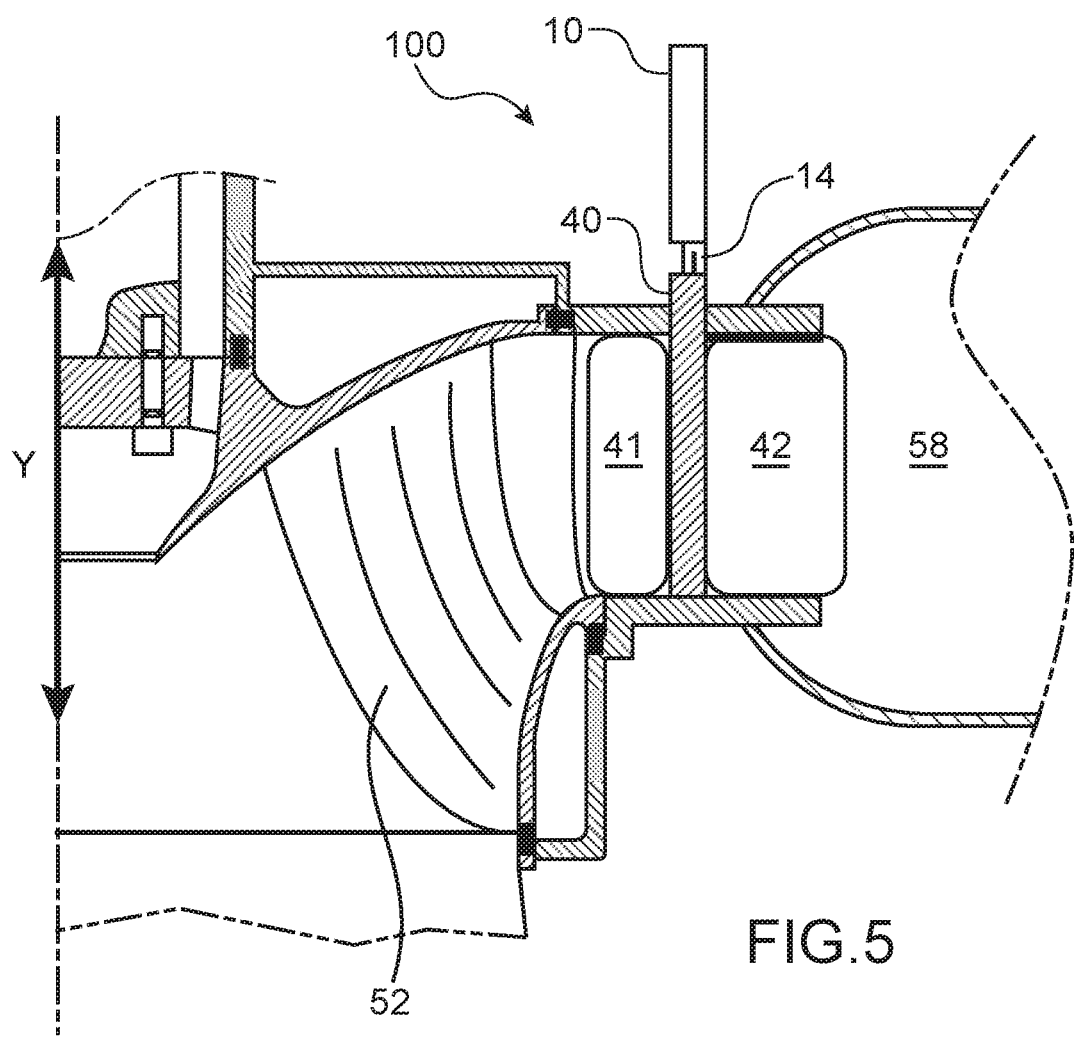
FIG. 5 is a cross-section of a hydraulic machine to which the invention can be applied.

FIG. 2 illustrates how several cylinders 10a, 10b, . . . according to the invention can be connected (through their actuating rods not shown on the figure) to a ring gate 40, at a plurality of locations around its perimeter. A ring gate 40 has a diameter which is for example between 2 m and 15 m. It is for example made of steel. FIG. 5 shows how each cylinder 10 can be connected to a ring gate 40, as well as other parts of a hydraulic machine.

According to US 2013/0098237, a system to control the actuation of a ring gate can comprises several groups of cylinders, each group comprising at least 2 cylinders, the cylinders of a same group being connected by at least one synchronization member.

Figure 3:
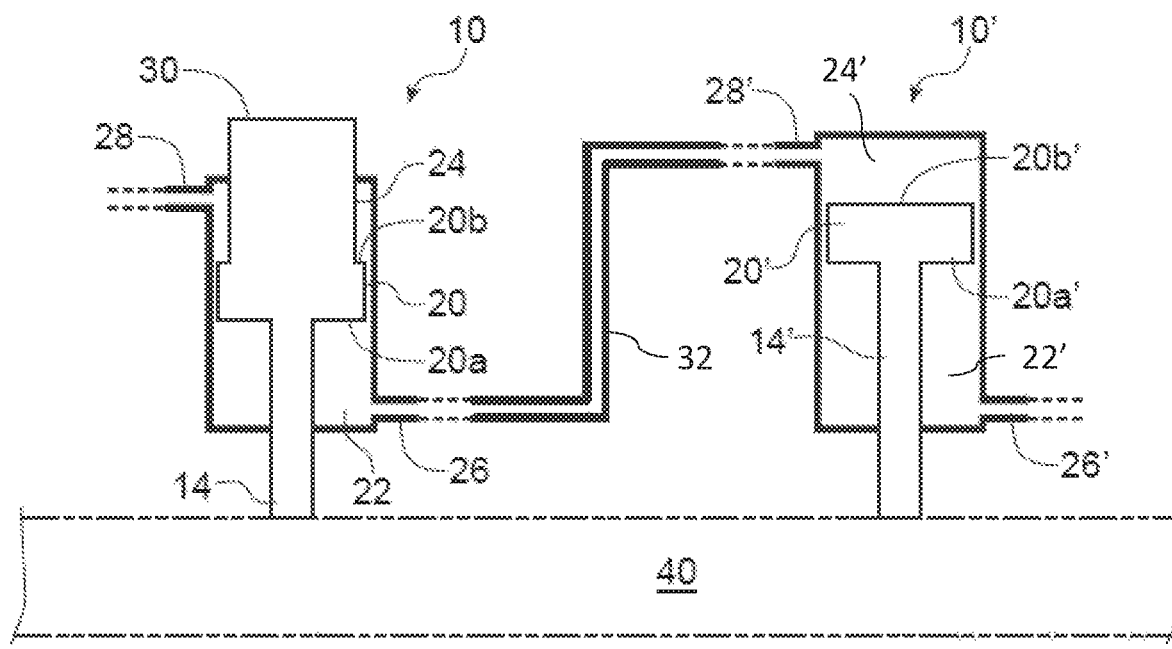
FIG. 3 shows a group of 2 cylinders connected as synchronization members.

A cylinder according to the invention can be used in such a group of cylinders. FIG. 3 shows a group of 2 cylinders 10, 10', of which cylinder 10 is a cylinder according to the invention, cylinder 10' having a structure according to FIG. 1C. The first chamber 22 of cylinder 10 is connected by a duct 32 to the second chamber 24' of piston 20' of cylinder 10'. Preferably, the area 20a of piston 20 of cylinder 10 is approximately equal to the area 20b' of piston 20' of cylinder 10'. Reference 40 designates the ring to which the actuating rods 14, 14' are connected.

The element 30 reduces the force necessary to control the movement of both cylinders 10, 10', the pistons 20, 20' moving in a same direction at the same time.

Figure 4:
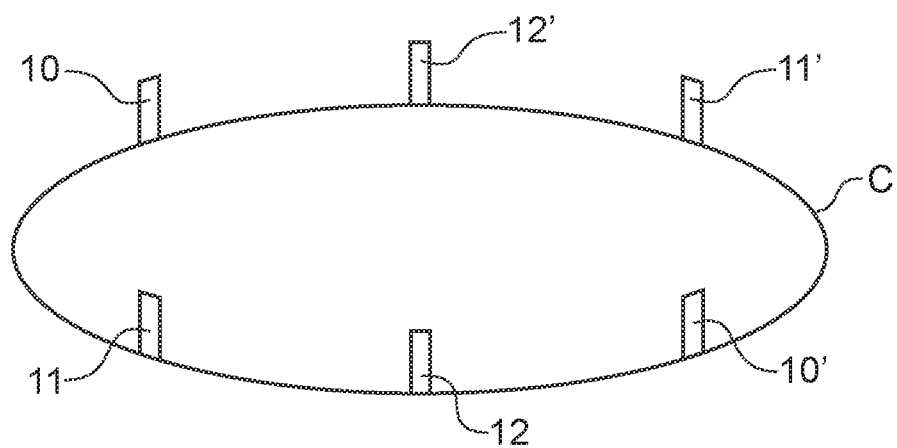
FIG. 4 shows a diagrammatic view of a ring gate and of 3 groups of cylinders, each group comprising a cylinder according to the invention.

As illustrated on FIG. 4, 3 such groups 10, 10', 11, 11', 12, 12' of cylinders are located on the perimeter C of a ring gate 40, two consecutive locations corresponding to cylinders belonging to different groups, two cylinders of same group being disposed diametrically opposite on the perimeter of the ring. Cylinders 10, 11, 12 are cylinders according to the invention (FIG. 1A), each including an additional element 30 in its second chamber, cylinders 10', 11', 12' being cylinders according to FIG. 1C, not having such an additional element.

Examples of hydraulic circuits to control the different groups of cylinders are given in US 2013/0098237.

In a variant, as explained in US 2013/0098237, the cylinders 10, 10' of a same group have approximately the same dimensions As shown in FIG. 5, a hydraulic machine 100, which may be of the turbine, pump, or paddle wheel pump type, implementing the invention comprises a paddle wheel 52, the ring gate 40 and several actuating cylinders 10 (of which only one is visible on FIG. 5) according to the invention. The ring gate 40 is movable along a direction Y, between an open position and a blockage position (which is illustrated on FIG. 5) of a water supply channel 58 of the paddle wheel. The ring gate 40 is installed between fixed guide vanes 42 and movable wicket gates 41 used to orient the flow of water toward the paddle wheel.

The invention claimed is:

1. A system for controlling movement of a ring gate of a hydraulic machine, comprising:

a plurality of groups of actuation cylinders, each group comprising:

a first actuation cylinder configured with the ring gate to control the movement of the ring-gate, the first actuation cylinder comprising a first, body forming a first chamber provided with a first duct and a second chamber provided with a second duct so that an actuating fluid is received in the first and second chambers via the first and second ducts, the first and second chambers separated by a piston connected to an actuating rod, the piston movable in the body in a first direction in which a volume of the second chamber increases while a volume of the first chamber decreases, and in a second direction in which the volume of the second chamber decreases while the volume of the first chamber increases, the piston having a rod connected in the second chamber to a second piston area facing the second chamber, the second piston area having a surface area less than a surface area of a first piston area facing the first chamber;

a second actuation cylinder comprising a second body forming a first chamber and a second chamber configured to receive an actuating fluid and separated by a second piston connected to an actuating rod and movable in the second body in a first direction in which a volume of the second chamber increases while a volume of the first chamber decreases, and in a second direction in which the volume of the second chamber decreases while the volume of the first chamber increases;

a hydraulic synchronization member connecting the first chamber of the first actuation cylinder and the second chamber of the second actuation cylinder.

2. The system according to claim 1, wherein the rod connected to the piston in the second chamber comprises a cylinder.

3. The system according to claim 2, wherein the cylinder is hollow.

4. The system according to claim 1, wherein the rod connected to the piston in the second chamber extends above a top of the first body through a watertight opening.

5. The system according to claim 1, further comprising a hydraulic circuit configured to feed the first chamber of the first actuation cylinder through the first duct and the second chamber of the first actuation cylinder through second duct with a fluid at a same pressure.

6. A hydraulic machine being one of a turbine, pump, or pump-turbine type, comprising a runner and a ring gate movable between a position of opening and a position of closing at least one channel that supplies the runner with water, and further comprising the system according to claim 1 to control movement of the ring gate.

7. A method of operating the system according to claim 1 or a hydraulic machine according to claim 6, wherein a fluid with a predetermined pressure (P) is fed to the first chamber of the first actuation cylinder through the first duct to move the piston in the second direction (II) and the same fluid with the same predetermined pressure (P) is fed to the second chamber of the first actuation cylinder through the second duct to move the piston in the first direction.

* * * * *